United States Patent Office 3,135,792
Patented June 2, 1964

3,135,792
NOVEL BISACETAMIDES
William F. Bruce, Havertown, and Joseph Tokolics, King of Prussia, Pa., assignors to American Home Products Corporation, New York, N.Y., a corporation of Delaware
No Drawing. Filed Mar. 6, 1962, Ser. No. 177,751
2 Claims. (Cl. 260—558)

The invention relates generally to amides, and more particularly to novel bisacetamides and salts thereof.

In U.S. Patent 2,780,646 there are disclosed novel alkanol aminobisacetamides, their salts, and methods for producing them. As noted in the patent, the compounds disclosed and claimed therein show surprisingly good local anesthetic action. However, it is stated in the patent that the replacement in the class of compounds disclosed therein, of the hydroxy group with an amino radical, for example, was found to destroy the local anesthetic action and that other than in the cases of aliphatic, aromatic or heterocyclic or inorganic acid esters of said compounds, no prediction with regard to local anesthetic action is possible when other radicals replace the alkanol residue attached to the amino nitrogen atom.

It has now been discovered that certain other bisacetamides as defined hereinafter which include compounds that do not contain an alkanol residue also show good local anesthetic action and, in addition, also show broad spectrum antibiotic action. The new compounds, in the form of the free bases, may be represented by the formula:

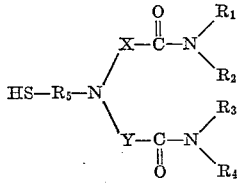

wherein $R_1$ and $R_3$ represent lower alkyl radicals, $R_2$ and $R_4$ represent aralkyl radicals, X and Y represent divalent lower alkylene radicals and $R_5$ represents a divalent radical of the group consisting of ethylene, lower-alkyl substituted ethylenes, and hydroxy-lower-alkyl substituted ethylenes. The aralkyl radicals $R_2$ and $R_4$ may represent phenyl- or substituted phenyl-lower alkyl radicals wherein such substituents as lower alkyl-, lower alkoxy-, hydroxy-, halogen-, nitro-, amino-, mono- or di-lower alkylamino radicals may be on the ring. In the case of aralkyls of the beta-phenylethyl type, hydroxy substituents on the beta-carbon of the alkyl are also contemplated. The lower-alkyl substituted ethylenes contemplated by the invention include, for example, the groups

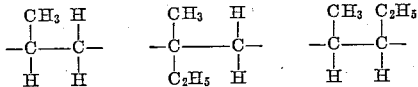

and the like. The hydroxy-lower-alkyl substituted ethylenes referred to are intended to include similar groups wherein the alkyl substituent or substituents may be replaced by hydroxy-alkyl radicals such as in

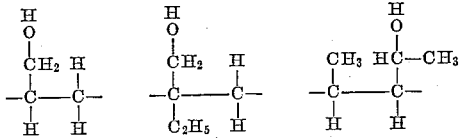

and the like. It has been discovered that when more than two carbon atoms separate the sulfur atom from the nitrogen atom of the amino group, the desired activity of the resulting compounds is affected adversely. However, increase of the total number of carbon atoms of the alkylene chain by the presence of branch chains does not have such effect nor when hydroxy-alkyl groups supply the additional carbon atoms, as exemplified above.

The combined local anesthetic action and antibiotic action of these new compounds falling within the definition above were totally unpredictable characteristics. Similarly, no prediction with regard to combined anesthetic and antiobiotic action is possible where the radical to which the acetamide groups are attached is other than of the classes specified above. For example the compounds (I) $NH_2.CH_2.CH_2N.[CH_2CON(CH_3)C(CH_3)_2.CH_2.C_6H_5]_2$ (II) $HO.(CH_2)_6.N.[CH_2CON(CH_3).C(CH_3)_2.CH_2.C_6H_5]_2$ were found to have neither anesthetic nor substantial antibiotic action.

Compounds falling within the scope of the formula as given above may be used in the form of acid-addition salts while still retaining their effectiveness for local anesthetic use or antibiotic action as the case may be. The salts provide great flexibility in therapeutic use since they may impart various degrees of water-solubility to an otherwise substantially insoluble base. With reference to the acid-addition salts, either organic or inorganic acids may be used as long as they do not substantially increase toxicity of the compound, particularly when the compound is to be used for its local anesthetic or in vivo antibiotic function. Thus, the hydrochloride, sulfate, phosphate, hydrobromide, acetate, tartrate, propionate or succinate are among the salts considered useful for the purposes indicated.

In preparing the novel bisacetamides of the invention, the free bases are prepared by reacting an appropriate amine which will furnish the desired mercapto-alkyleneamino residue (as defined above) in the final compound, with an alpha-halo-fatty acid amide containing the required lower alkyl and aralkyl substituents on the nitrogen atom as specified hereinbefore, in a molar ratio of 1:2. Preferably, the amide is present in slight excess of the ratios stated.

On the other hand, where the fatty acid amide residues in the final compounds are desired to be dissimilar, as, for example, where X and Y are to be different alkylene radicals or where $R_1$ is to differ from $R_3$, the bases may be prepared by initially reacting in a molar ratio of say about 1:1, the chosen amine that will supply the mercapto-alkylene-amino radical as defined herein, with a halo-fatty acid amide that will supply the X and $R_1$ radicals desired. The resulting amino-fatty acid amide may then be reacted with another halo-fatty acid amide in say about 1:1 molar ratio, the latter amide being chosen so that it will supply the differing Y and $R_3$ radicals desired in the final bisacetamide. Alternately, appropriate mixtures of differing halo-fatty acid amides may be reacted simultaneously with the amine compound. The halogen atom in the halo-fatty acid amides used may be either chlorine or bromine. Generally, the bisacetamides of the invention are prepared as taught by the general procedure outlined in the patents to Bruce et al., 2,568,142, dated September 18, 1951, or 2,654,754, dated October 6, 1953, suitably modified, of course, to provide the proper amine and halogenated reactants.

The reaction of the amide and amine is carried out substantially under conditions as described in the above-mentioned U.S. Patent No. 2,780,646. Thus, the reaction temperature is in the range of about 80° to about 200° C. but is preferably in the narrower range of about 100° to about 180° C. Alcohols of 3 to 7 carbon atoms, anisole, dioxane hydrocarbon solvents, such as xylene, or in fact, any inert solvent boiling within the ranges indicated are suitable, reaction taking place at the refluxing temperature of the solvent. Acid acceptors or mildly basic material are also provided for the reaction. These acceptors may be an alkali or alkaline earth metal oxide, carbonate or bicarbonate, pyridine, or like substances.

To prepare the acid-addition salts of the compounds discussed herein, the free base is generally dissolved in a suitable solvent and the selected acid is added thereto. Such preparation of acid-addition salts is well known and hence need not be described herein.

The following example illustrates the preparation of a typical compound falling within the scope of the invention.

EXAMPLE 1

Preparation of 2,2'-(2-Mercapto-Ethylimino)Bis [N-(a, a - Dimethylphenethyl)-N - Methylacetamide]Hydrochloride

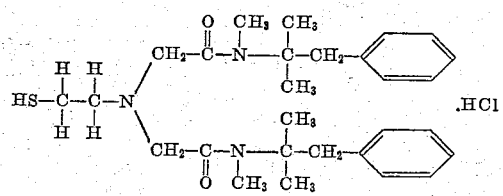

A mixture of 58 g. of 2-chloro-N-(a,a-dimethylphenethyl)-N-methylacetamide, 10 g. of 2-mercapto-ethylamine hydrochloride, 50 g. of powdered anhydrous potassium carbonate and 300 ml. of n-butanol was refluxed for 24 hours. The reaction mixture was then cooled and filtered. The filtrate was washed with aqueous 5% sodium carbonate then with water, and dried over anhydrous magnesium sulfate. The solvent was completely removed under reduced pressure.

The free base was converted to the hydrochloride by dissolving the residue in ether and adding dry hydrogen chloride. Recrystallized from acetone-chloroform, it melted at 138–140° C.

Analysis.—Calcd. for $C_{28}H_{42}ClN_3O_2S$: C, 64.65; H, 8.14; Cl, 6.81; N, 8.07; S, 6.16. Found: C, 64.43; H, 7.96; Cl, 7.00; N, 8.04; S, 6.24.

The product of Example 1 in the form of the designated acid-addition salt and several other compounds included for purposes of comparison were tested to determine their respective local anesthetic and bacteriostatic action. The method of testing for local anesthetic action comprised the simple procedure of placing .1 mg. of the compound of the tongue of a human and then noting subjectively the time it took for numbness to subside. To designate the degree of local anesthetic action of the compounds tested, an arbitrary scale was employed wherein + was used to designate anesthetizing characteristics which persist for from 2–5 minutes. On this same scale ++ would indicate anesthetic action for from 15–20 minutes, and +++ for such action enduring from 1–2 hours. The ++++ designation was used to indicate anesthetic action wherein numbness persisted for 3–4 hours; the +++++ rating would be applied to compounds causing numbness for from 8–10 hours and the +++++ rating would designate local anesthetic action persisting from 15–20 hours. This scale is employed in the table below.

In testing for bacteriostatic action, the method generally comprised preparation of a plurality of Petri dishes each containing a predetermined amount of agar media into which solutions of decreasingly varying concentrations of each of the compounds under consideration were incorporated starting with a maximum concentration thereof per volume of solution, to which a standard volume of a given bacterial strain was later introduced. If bacterial growth was observed to be halted, the same standard volumes of the given bacterial strain were separately added to each of other agar specimens containing lesser amounts of the compound being tested. In said agar specimens, decreasing concentrations of a specified compound of 1000, 500, 250, 100, 25, 10 and 1 μg. were utilized.

In the specific application utilized, a series of stock solutions were prepared, each at a level of 10,000 μg./ml., by dissolving the compound being tested in water. As known in the art, other suitable solvents such as ethanol, methylcellosolve, propylene glycol, etc. may be employed. Thereafter, working dilutions of the decreasing concentrations referred to above were made from each stock solution with inclusion of phosphate buffer to achieve pH 6–7. One ml. volumes of the varying working dilutions were then transferred to sterile Petri dishes. To each dish containing the one ml. volume of a specific working dilution of a given compound were then added 9 ml. of sterile penicillin seed agar and the test compound was thoroughly mixed into the agar. Solvent and buffer controls were included. The test organisms were grown in brain heart infusion broth for 18 hours at 35° C. and diluted to 1/10 concentration prior to use. The test organisms, in volumes of approximately 0.8 μl. were then mechanically deposited on the cooled and hardened surface of the agar of each dish by means of an inocula replicator device. The dishes were then incubated for 18 hours at 35° C. before being read. The minimal inhibitory concentration (MIC) value recorded for comparison was the least amount of the compound under test that completely inhibited the specific test organism employed.

The results of the foregoing tests on the compound of the example and on the other compounds included for comparison are given in the table below:

TABLE

| Acid-Addition Salt | Anesthetic Action | Bacteriostatic Action | | | | | | | | | |
|---|---|---|---|---|---|---|---|---|---|---|---|
| | | B. subtillis | S. aureus | Mycobact. spp. | Pseudomonas aeruginosa | E. coli | S. paratyphi | Brucella bronchiseptica | Neisseria catarrhalis | L. casei | S. lactis R |
| 1. Compound of the Example | ++++ | 10 | 50 | 500 | >1,000 | >1,000 | 500 | 25 | 50 | 100 | 100 |
| 2. Cocaine Hydrochloride | + | | | | | | | | | | |
| 3. 2,2'-(2-hydroxypropylimino) bis [N-(2,6-dimethylphenyl)-N-methylacetamide] .hydrochloride | Negative | | | | | | | | | | |

It will be observed that Compound 1 coming within the scope of the invention showed local anesthetic action of a marked degree. The importance of such characteristics will be more readily recognized when it is noted that Compound 1 was found to be about $4 \times 10^3$ as effective as novacaine or cocaine. In addition, Compound 1 showed significant bacteriostatic action. On the other hand, the results with respect to Compound 2 clearly demonstrated the unpredictability of combined local anesthetic and bacteriostatic action upon variation of the amine residue from the definition thereof in accordance with the present invention. It is of further significance in connection with the unpredictability of finding combined anesthetic and bacteriostatic action in a given compound that, with respect to the local anesthetic novacaine, Moeller and Schwarz, Ber. 74B 1612 (1941) state that contrariwise the compound is a weak growth promoter for bacteria.

EXAMPLE 2

*Preparation of 2,2'-(2-Mercaptopropylimino)Bis[N-(a,a-Dimethylphenethyl)-N-Methylacetamide]Hydrochloride*

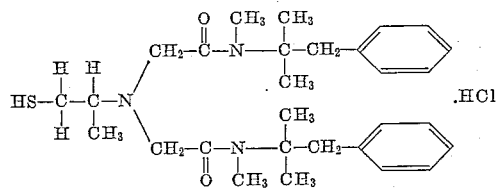

As in Example 1, a mixture of 2-chloro-N-(a,a,-dimethylphenethyl)-N-methylacetamide 58 g., beta-aminopropylmercaptan hydrochloride 12.8 g., 50 g. of powdered anhydrous potassium carbonate, and 300 ml. of n-butanol is refluxed 24 hours, cooled and filtered. The filtrate worked up as in Example 1 yields the hydrochloride of the product formulated above.

EXAMPLE 3

*Preparation of 2,2'-(2-Mercaptoethylimino)Bis[N-(a,a-Dimethylphenethyl) - N - Methylpropionamide]Hydrochloride*

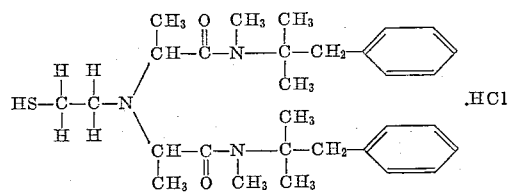

By the procedure of Example 1, a mixture of 102 g. of 2-chloro-N-(a,a-dimethylphenyl)-N-methylpropionamide, 10 g. of 2-mercaptoethylamine hydrochloride, 50 g. of powdered anhydrous potassium carbonate and 300 ml. of n-butanol is refluxed for 24 hours and worked up to give the hydrochloride of the title compound.

We claim:
1. A compound of the group consisting of aralkyl amides and the non-toxic acid-addition salts thereof, said amides having the formula

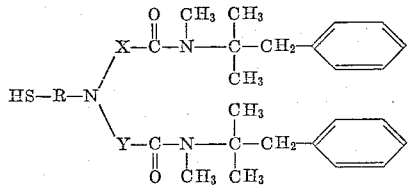

wherein R is a divalent radical of the group consisting of ethylene, lower-alkyl substituted ethylene and hydroxy lower-alkyl substituted ethylene, and X and Y are divalent radicals of the group consisting of lower alkylene and lower-alkyl substituted lower alkylene.

2. The compound, 2,2'-(2-mercaptoethylimino)bis[N-(a,a-dimethylphenethyl)-N-methylacetamide].

References Cited in the file of this patent

UNITED STATES PATENTS 2,780,646     Seifter et al. _____ Feb. 5, 1957

FOREIGN PATENTS 1,060,404     Germany _____ July 2, 1959

UNITED STATES PATENT OFFICE
CERTIFICATE OF CORRECTION

Patent No. 3,135,792                                        June 2, 1964

William F. Bruce et al.

It is hereby certified that error appears in the above numbered patent requiring correction and that the said Letters Patent should read as corrected below.

Column 3, line 38, for "either" read -- ether --; line 64, for "of", first occurrence, read -- on --; column 6, line 2, for "dimethylphenyl" read -- dimethylphenethyl --.

Signed and sealed this 29th day of December 1964.

(SEAL)
Attest:

ERNEST W. SWIDER
Attesting Officer

EDWARD J. BRENNER
Commissioner of Patents